June 21, 1966 H. J. KEINANEN 3,256,846
MAGNETIC IMPULSE CAN FLANGING AND SEPARATING
APPARATUS AND METHOD
Filed April 24, 1963

INVENTOR
HENRY J. KEINANEN

BY Mason, Porter, Diller & Stewart
ATTORNEYS

United States Patent Office 3,256,846
Patented June 21, 1966

3,256,846
MAGNETIC IMPULSE CAN FLANGING AND SEPARATING APPARATUS AND METHOD
Henry J. Keinanen, Oak Lawn, Ill., assignor to Continental Can Company, Inc., New York, N.Y., a corporation of New York
Filed Apr. 24, 1963, Ser. No. 275,250
13 Claims. (Cl. 113—120)

This invention relates in general to new and useful improvements in the forming of metal cans, and more particularly relates to novel apparatus and method for forming can bodies from a continuous tube.

Many attempts have been made to devise a practical system of forming can bodies from a continuous tube. Numerous problems have been encountered beginning with the forming of suitable seams by welding processes. The forming of welded seams has now been perfected from a practical standpoint. However, the handling and separation of the continuously welded tube has posed a problem which has not been solved from a practical standpoint. It is, therefore, the primary object of this invention to provide a novel apparatus which will receive a tube immediately after it has been formed and which will successively separate the tube into accurate can body lengths in a practical manner.

Another object of this invention is to provide a novel apparatus for receiving a moving tube immediately after it is formed and simultaneously separating the tube into accurate can body lengths and flanging the ends of the separate can body lengths whereby a tube passes into the apparatus and a flanged can body is delivered by the apparatus.

Another object of this invention is to provide a novel method of forming flanged can bodies from a continuous tube, the method including the steps of forming an outwardly directed bead on the tube and then removing outermost portions of the bead whereby the bead is divided in half, thus separating from the tube a portion thereof with the half of the bead on that portion constituting a flange.

Another object of this invention is to provide a novel apparatus which will, in sequence, form an external bead on a moving tube and then remove outermost portions of the bead whereby a simultaneous flanging and separation of can bodies is accomplished.

A further object of this invention is to provide a novel apparatus for simultaneously separating and flanging can bodies from a continuously formed tube, the apparatus including an external die including an upstream fixed half and a downstream segmental half, means within the path of the tube for outwardly forcing the tube to conform to the shape of the die in timed relation to the movement of the tube through the die, the segmental half of the die being resiliently mounted whereby after an external bead has been formed on the tube, the tube can move out of the die without interrupting its longitudinal movement, the apparatus further including abrading means disposed along the path of the tube and positioned adjacent the die for removing the outermost positions of the newly formed bead whereby can bodies are separated from the tube at each bead, and the can bodies have flanged end portions as a result of the formation of the bead.

Still another object of this invention is to provide an apparatus in accordance with the foregoing object wherein the pressure producing means internally of the path of the tube is in the form of a magnetic coil and the pressure exerted on the tube to form the bead is one effected by magnetic impulse.

With the above and other objects in view that will hereinafter appear, the nature of the invention will be more clearly understood by reference to the following detailed description, the appended claims and the several views illustrated in the accompanying drawing:

Figures 1, 3:
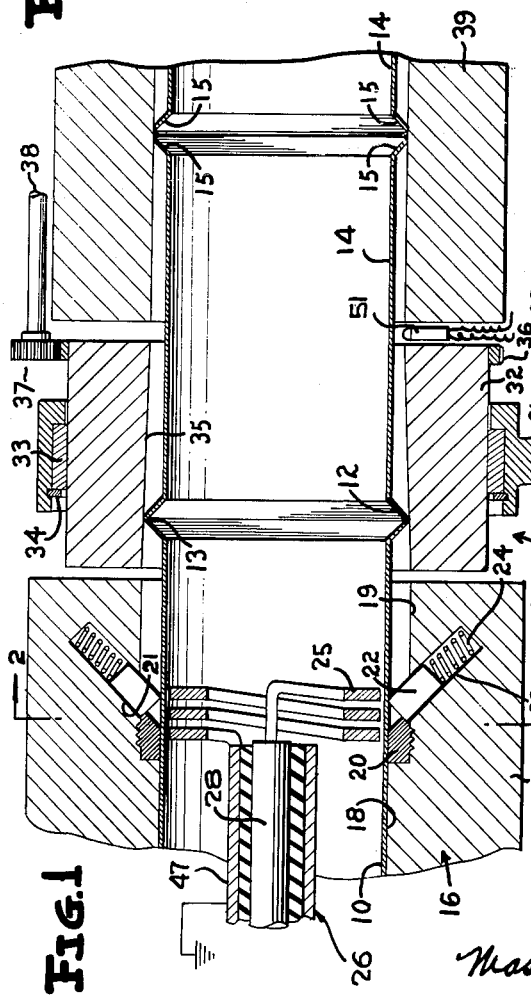
FIGURE 1 is a longitudinal sectional view taken through the apparatus which is the subject of this invention, and shows the details of the apparatus and the manner in which it operates.
FIGURE 3 is a fragmentary sectional view showing the central portion of a modified form of apparatus wherein a cutter head is substituted for a grinding wheel shown in the apparatus of FIGURE 1.

Referring now to the drawings in detail, reference is first made to FIGURE 1 wherein there is illustrated a tube 10. The tube 10 is formed of metal and may be provided with any desired type of seam. However, in the practical aspect of the invention, the tube 10 will be provided with a longitudinal welded seam so that the tube 10 may be continuously formed at a high rate in the vicinity of 500 feet per minute and above.

In accordance with this invention, the tube 10 is passed through an apparatus, generally referred to by the numeral 11. At predetermined intervals the tube 10 is worked upon to be provided with outwardly projecting beads 12 which are preferably V-shaped in cross section. Each bead 12 has an apex 13. The apex 13 of each bead 12 is then removed so that each bead 12 is separated into two halves. The separation of each bead 12 in half separates from the tube 10 a can body of a predetermined length. Since each end of the can body 14 is defined by a bead half, it will be seen that a can body, at the time it is separated from the tube 10, is provided with end flanges 15. Thus, in accordance with this invention, a tube 10 is continuously fed into the apparatus 11 and flanged as the can bodies 14 are delivered from the apparatus.

Figure 2:
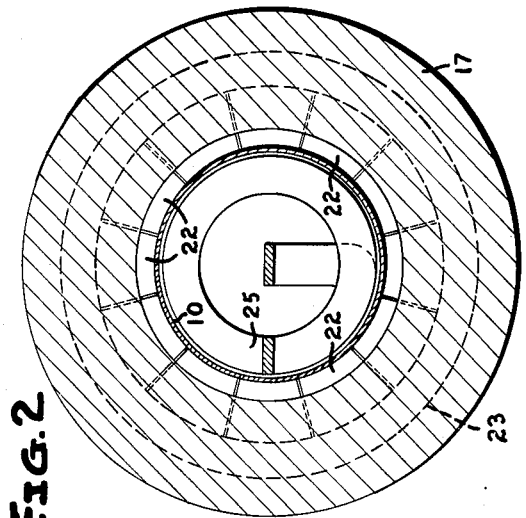
FIGURE 2 is a transverse vertical sectional view taken along the line 2—2 of FIGURE 1 and shows specifically the details of a bead shaping die.

In a preferred embodiment of the invention shown in FIGURES 1 and 2, the apparatus 11 includes a die unit, generally referred to by the numeral 16. The die unit 16 includes a housing 17, which is suitably mounted in any conventional manner. The die housing 17 has a bore 18 therethrough of a size to receive the tube 10 in tight relation. The bore 18 is provided at the exit end of the housing 17 with a counterbore 19 of a size to clear the beads 12. The housing 17 has threaded in the interior end of the bore 19 a fixed die half 20. A segmental die half 21 is associated with the fixed die half 20. The segmental die half 21 is formed of a plurality of circumferentially arranged die segments 22 which are mounted in an annular slot 23 formed in the interior of the housing around the counterbore 19 and generally opposing the fixed die half 20. Each of the die segments 22 is free to move to a recessed position within the slot 23, and it is spring urged into a cooperating position with the fixed die half 20 by means of a spring 24 seated within the slot 23.

In accordance with this invention, the tube 10 is formed outwardly while within the die unit 16 into conformance with the contour of the die halves 20 and 21 by magnetic impulse. In order to accomplish this, there is mounted within the die unit 16 in alignment with the die halves 20 and 21 a coil 25 which is carried by a suitable support 26 in the form of a co-axial cable. It is to be understood that the co-axial cable 26 will be supported in a conventional manner from the conventional horn of the apparatus which continuously forms the tube 10. The coaxial cable 26 has an outer tubular conductor 47 and an inner rod shaped conductor 28; each conductor being connected to the coil 25. The outer conductor is grounded to the apparatus which continuously forms the tube. The conductors are suitable electrically insulated from each other as illustrated. The manner in which the coil 25 functions in cooperation with the die halves 20 and 21 to form the beads 12 will be described hereinafter.

The continuously moving tube 10 with the beads 12 formed therein next passes into an abrading unit, generally referred to by the numeral 30. The simplest form of abrading unit includes a fixed support 31 in which there is rotatably journaled an internal grinding wheel 32. Any type of bearing means may be provided for mounting the grinding wheel 32 within the support 31 although a sleeve bearing 33 has been illustrated. For illustrative purposes a retaining ring 34 is provided to axially position the grinding wheel 32 with respect to the support 31. The grinding wheel 32 is provided with a longitudinally tapered internally grinding surface 35.

The exterior of the grinding wheel 32 is provided with a ring gear 36 which is engaged by a pinion 37 carried by a drive shaft 38. Thus, the grinding wheel 32 may be rapidly rotated as the tube 10 passes therethrough. Necessarily the tube 10 clears the grinding wheel 32. However, the surface 35 is proportioned so that as each bead 12 enters thereinto, it engages the surface 35 and as it moves through the grinding wheel 32, the apex 13 of the bead 12 is gradually ground away to the extent that there is a dividing of the bead 12 in half and a separation of the can body 14 from the tube 10.

The apparatus 11 also includes a can body guide 39. The guide 39 is illustrated as being in the form of a tubular guide which receives the can bodies 14. However, it is to be understood that the guide 39 could easily as well be an internal guide in the form of a horn or like type of support.

Figures 4, 5:
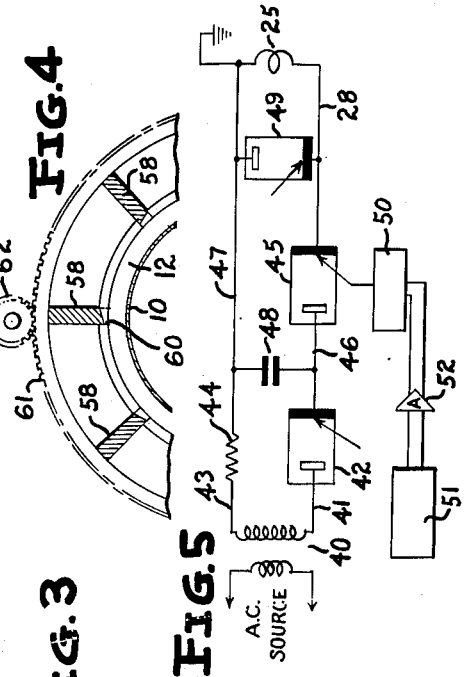
FIGURE 4 is a fragmentary transverse vertical sectional view taken generally along the line 4—4 of FIGURE 3 and shows the manner in which the cutter head is constructed and driven.
FIGURE 5 is a wiring diagram of the bead forming apparatus.

Referring now to FIGURE 5 in particular, it will be seen that the work coil 25 is part of an electrical circuit which includes a high voltage transformer 40 which is connected to any conventional alternating current source. One output lead 41 of the transformer 40 is connected to a charge ignitron 42 of a conventional type. The other output lead 43 of the transformer 40 has a resistor 44 connected thereto which is connected to the electrical conductor 47. The charge ignitron is connected to a series ignitron 45 by means of a conductor 46. An energy storage capacitor 48 is connected between conductors 46 and 47.

The conductor 28 is connected to the cathode end of the series ignitron 45. A crowbar ignitron 49 of a conventional type is mounted across the conductors 47 and 28 in parallel to the work coil 25. The capacitor 48, the series ignitron 45 and the crowbar ignitron 49 are coaxially built.

The firing of the work coil 25 is controlled through the series ignitron 45. This is accomplished by means of a conventional type of ignitor firing device 50 which is connected to the series ignitron 45. The ignitor firing device 50 is energized by means of a reflex type photoelectric device 51 of a conventional type which is coupled to the ignitor firing device 50 through an amplifier 52.

Referring once again to FIGURE 1, it will be seen that the reflex type photoelectric device 51 is positioned from the work coil 25 at a distance which is substantially equal to a unit multiple of the length of the can body 14. This distance may vary slightly due to the lag in the operation of the electric system for firing the coil 25. As a bead 12 passes the reflex type photoelectric device 51, the control circuit for the work coil 25 is energized. In this manner, the beads 12 are formed at accurately spaced intervals.

When the current is rapidly passed through the work coil 25, current is induced into the surrounding portion of the tube 10 and the magnetic repulsion effect between the work coil 25 and the tube 10 is sufficient to force the tube 10 outwardly with sufficient force to shape it within the die halves 20 and 21. The inertia of the die segments 22 will hold the segmental die half 21 in place for a time sufficient for the completion of the forming of a bead 12. The forming force and the motion of the tube 10 will cause the die segments 22 to move outwardly into the slot 23 whereby the newly formed bead 12 is free to pass the die segments 22. The springs 24 will return the die segments 22 to their positions cooperating with the fixed die half 20 after the bead 12 has passed.

At this time it is pointed out that the bead 12 is rapidly formed with the complete bead forming operation being completed in 10 to 20 microseconds. Should the line speed for the tube 10 be 500 feet per minute, the tube motion during the bead forming operation will be between 0.001 inch and 0.002 inch.

Reference is now made to FIGURES 3 and 4 wherein there is illustrated a modified form of abrading unit, generally referred to by the numeral 53. The abrading unit 53 includes a pair of spaced supports 54 in which a cutter head, generally referred to by the numeral 55, is mounted for rotation. The cutter head 55 includes a pair of end members 56 which are journalled within the supports 54 by means of suitable bearings. Any type of bearing may be utilized, although for simplicity purposes, the sleeve bearings 57 have been shown. A plurality of longitudinally extending cutters 58 extend between and are secured to the end members 56. The cutters 58 have cutting edges 60 which taper relative to the axis of the tube 10.

In order that the cutter head 55 may be rapidly rotated, one of the end members 56 is provided with a ring gear 61. A drive pinion 62, which is carried by a drive shaft 63, is meshed with the ring gear 61. The direction of rotation of the cutter head 55 will, of course, be in the proper direction to effect the cutting operation.

As the bead 12 passes into the abrading unit 53, the apex 13 thereof is brought into gradual engagement with the cutting edge 60 of the cutters 58 and the outermost portions of the bead 12 are cut away by the cutters 58 in the same manner as described with respect to the grinding wheel 32 so that as the bead 12 exits through the abrading unit 53, the apex 13 will be entirely cut away and the bead 12 divided into two halves. At the same time, a newly formed can body 14 will be separated from the tube 10 and this can body 14 will have flanged ends 15.

It is to be understood that the abrading unit 53 will be utilized to replace the abrading unit 32. The apparatus 11, when incorporating the abrading unit 53 will operate the same as that described above.

It is to be understood that the shape of the bead 12 may be varied slightly by changing the contour of the die halves although the sharp configuration of the illustrated bead is preferred. Also, it is feasible to form the bead 12 by pressure applying means other than magnetic impulse. However, to date magnetic impulse forming has been found to be the most practical.

Although only preferred embodiments of the invention have been specifically illustrated and described herein, it is to be understood that other minor modifications may be made in the apparatus and method described within the spirit and scope of the invention, as defined in the appended claims.

I claim:

1. A method of forming flange ended tubular members comprising the steps of providing a length of tubing, forming an outwardly projecting rib on said tubing, and then removing an outermost portion of said rib entirely around said tubing to separate said tubing into two flanged and tubular members, said tubing being longitudinally moved during the rib forming and the rib portion removal operations.

2. A method of mass producing flanged can bodies and like flanged ended tubular members from tubing comprising the steps of continuously longitudinally moving the tubing, forming outwardly projecting ribs having central apices at regularly spaced intervals on the moving tubing, and then removing the apex of each moving rib to separate the tubing into a plurality of separate can bodies.

3. The method of claim 2 wherein said rib forming operation is a magnetic impulse forming operation, and each rib is used as a sensed target controlling the timed forming of a following rib.

4. A method of forming circumferentially ribbed tubing comprising the steps of continuously longitudinally moving the tubing, while magnetic impulse forming ribs in the tubing at spaced intervals.

5. An apparatus for forming flange ended tubular members from tubing comprising a tubing guide for guiding longitudinally moving tubing, said tubing guide having an exit end, rib forming means carried by said tubing guide adjacent said exit end, a tubular member guide disposed in longitudinally spaced relation to said tubing guide to receive said tubular members from an abrading means, and said abrading means intermediate said tubing guide and said tubular member guide for removing a circumferential portion of each rib to separate a ribbed tube at each rib into separate tubular members having flanged ends.

6. The apparatus of claim 5 wherein said abrading means is in the form of an internally tapered grinding wheel.

7. The apparatus of claim 5 wherein said abrading means is in the form of an internally tapered cutter.

8. An apparatus for forming flange ended tubular members from tubing comprising a tubing guide for guiding longitudinally moving tubing, said tubing guide having an exit end, rib forming means carried by said tubing guide adjacent said exit end, a tubular member guide disposed in longitudinally spaced relation to said tubing guide, and abrading means intermediate said tubing guide and said tubular member guide for removing a circumferential portion of each rib to separate a ribbed tube at each rib into separate tubular members having flanged ends, said rib forming means including an external die and internal force applying means aligned with said die, and said die including a fixed rear half and a movable forward half retractible to permit the passage of a newly formed rib.

9. The apparatus of claim 8 wherein said die movable forward half is formed of a plurality of segments spring urged together.

10. The apparatus of claim 8 wherein said internal force applying means includes a magnetic impulse coil having means for connection to a source of electrical energy.

11. The apparatus of claim 8 wherein said internal force applying means includes a magnetic impulse coil having means for connection to a source of electrical energy, and a detector for controlling the energization of said coil at regular tubing spacings.

12. An apparatus for sequentially forming outwardly projecting longitudinally spaced apart beads on a tube that is being advanced in the direction of its axis comprising: a bead forming die unit having an opening therein through which the tube passes; said die unit including a fixed die portion encompassing the tube and a segmented annular die portion encompassing the tube; said segmented die portion being positioned adjacent the fixed die portion on the downstream side thereof with respect to the advancing tube; said fixed and segmented die portions including surfaces contoured to the desired shape of the outwardly projecting beads to be formed; forming means positioned internally of the tube within the said die unit opening for sequentially exerting an outwardly directed force on the advancing tube to form the tube against the contoured die surfaces so as to create spaced apart beads on the tube; said segmented die portion being resiliently retractable, permitting it to ride over and clear each formed bead.

13. The apparatus of claim 12 wherein said forming means positioned internally of the tube includes a magnetic impulse coil having means for connection to a source of electrical energy.

References Cited by the Examiner

UNITED STATES PATENTS

| | | | |
|---|---|---|---|
| 933,104 | 9/1909 | Norton | 113—120 |
| 1,478,060 | 12/1923 | Richman | 113—120 |
| 2,139,682 | 12/1938 | Hothersall | 113—120 |
| 2,976,907 | 3/1961 | Harvey et al. | 29—421 |

CHARLES W. LANHAM, *Primary Examiner.*

RICHARD J. HERBST, *Examiner.*